Patented Oct. 15, 1946

2,409,248

UNITED STATES PATENT OFFICE 2,409,248

POLYMERIZATION

John W. Brooks, Wenonah, and Arlie A. O'Kelly, Woodbury, N. J., and Robert H. Work, Philadelphia, Pa., assignors to Socony-Vacuum Oil Company, Incorporated, a corporation of New York No Drawing. Application June 14, 1944,
Serial No. 540,316

12 Claims. (Cl. 260—683.15)

This invention relates to polymerization reactions, and is more particularly concerned with the provision of new catalysts capable of promoting polymerization reactions.

It is well known in the art, to effect a union between molecules of an unsaturated hydrocarbon to produce a compound, called a copolymer, the molecular weight of which, is an even multiple of the molecular weight of the original hydrocarbon. The operation is called copolymerization and the conditions of temperature, pressure, etc., are called coplymerizing conditions. The union may also take place among molecules of two or more dissimilar unsaturated hydrocarbons, to produce compounds that represent additions of the two or more unsaturated hydrocarbons. The compounds thus produced are referred to as interpolymers, as distinguished from the compounds obtained when molecules of an unsaturated hydrocarbon condense with themselves, and the operation is called interpolymerization. In the interest of brevity, copolymerization and interpolymerization will be referred to hereinafter, broadly, as polymerization, and the conditions of temperature, pressure, etc., will be referred to, accordingly, as polymerizing conditions, it being clearly understood, that the nature of the union will bcome apparent to those versed in the art, from the character of the reactants used in any particular reaction.

As is well known to those familiar with the art, polymerization reactions of the type referred to hereinbefore, may be conducted at relatively high temperatures and pressures; or may be carried out at lower temperatures and pressures, in the presence of substances or of mixtures of substances, that promote the polymerization reaction. These substances are referred to as copolymerization catalysts or interpolymerization catalysts, depending on the type of reaction they catalyze; or in keeping with the terminology established herein, they may be referred to broadly, as polymerization catalysts. Several substances have been proposed as polymerization catalysts, and among the most widely used are phosphoric acid, sulfuric acid, hydrogen fluoride, aluminum chloride and boron trifluoride.

We have now found that fluophosphoric acids are effective polymerization catalysts.

It is an object of the present invention to provide a process for catalytically promoting polymerization reactions. Another object is to provide an efficient process for catalytically polymerizing normally gaseous olefinic hydrocarbons for the purpose of manufacturing motor fuels. A very important object of the present invention is to afford a process capable of carrying out the above objects by using new polymerization catalysts.

A more specific object is to provide new polymerization catalysts. Other objects and advantages of the present invention will become apparent to those skilled in the art from the following description.

Broadly stated, the present invention provides a process for effecting the polymerization of olefinic hydrocarbons, which comprises contacting the olefinic hydrocarbon reactants in a reaction zone under polymerizing conditions, with a fluophosphoric acid.

The new polyymerization catalysts of our invention are monofluophosphoric acid, $H_2PO_3F$, and difluophosphoric acid, $HPO_2F_2$. These acids have been obtained from the Monsanto Chemical Company. Monofluophosphoric acid is a viscous liquid that fumes slightly on contact with air. It has a specific gravity of about 1.25 at 20° C. and decomposes upon heating to an elevated temperature. It can be used many times before it loses its activity. Difluophosphoric acid is also a viscous liquid; however, it fumes strongly on contact with air and is highly corrosive towards glass. It likewise decomposes upon heating to an elevated temperature. Both of these acids separate readily from hydrocarbons to form a layer.

The amounts of fluophosphoric acids used in our process, may vary between about 5% and about 50%, with respect to the weight of the hydrocarbon reactants in the charge. Larger amounts may be used, if desired, although no additional advantages seem to result therefrom.

The fluophosphoric acids of our invention, may be used to catalyze reactions involving coplymerization or interpolymerization of normally gaseous olefinic hydrocarbons, propene, butenes and pentenes, to produce coplymers or interpolymers, that boil within the boiling range of motor fuels. These products are highly desirable in view of their high-octane ratings, and accordingly, the use of our new catalysts in the polymerization processes for manufacturing high-octane motor fuels, must be considered a preferred embodiment of our invention.

The olefinic hydrocarbons to be used in our process may be derived from any suitable source, as is well known in the art. A conventional and preferred source of the hydrocarbons used in the preferred embodiment of our invention, that of manufacturing motor fuels, is the fixed gases obtained around petroleum refineries, as is well understood in the art. These hydrocarbons may be used either in the pure state or in admixture with other constituents not undesirable. In this connection, it must be noted that when the polymerization reaction involves for example, copolymerization or interpolymerization of the normally gaseous olefinic hydrocarbons for the purpose of manufacturing motor fuels, under the polymerizing conditions extant in the reaction zone, and in the presence of our new catalysts, it is difficult to control the degree of copolymerization and/or interpolymerization, with the result that the products obtained contain large amounts of copolymers and/or interpolymers, that have boiling points outside the boiling range of motor fuels.

We have found also, that the degree of copolymerization and/or of interpolymerization of the olefinic hydrocarbons in the presence of our novel polymerization catalysts, may be controlled through the use of a saturated hydrocarbon diluent, thereby insuring a product that will contain predominantly, constituents that boil within the boiling range of motor fuels. Accordingly, the charge stock of our process may consist of a refinery $C_4$-cut, containing, for example, 4.4% isobutene, 13.4% 1- and 2-butenes, 1% propene, and the balance mainly normal butane and isobutane. In general, compounds or mixtures of compounds that are inert under the polymerizing conditions of our process, and which can be easily separated and removed from the product, if desired, are suitable diluents. Accordingly, paraffinic hydrocarbons have been found to be very effective diluents of this type. Paraffinic hydrocarbons that are suitable diluents in the process of manufacturing motor fuels, comprise propane, normal butane, isobutane, normal pentane and isopentane, and mixtures thereof. It must be understood, of course, that paraffinic hydrocarbons such as hexane, heptane, octane and the like, may be used if desired; however, and by way of example, if the product contains $C_7$-olefinic hydrocarbons, the diluent, if heptane, can be separated and removed therefrom with difficulty. On the other hand, if not objectionable, the diluent or diluents may be left in the product. In commercial applications of our process, the charge stock containing the olefinic hydrocarbons to be copolymerized or interpolymerized, may contain also the necessary diluent or diluents. Thus, in a charge stock containing light olefinic hydrocarbons and higher paraffinic hydrocarbons, the higher paraffinic hydrocarbons will act as the diluent and if not objectionable for the intended use of the product of the polymerization operation, may be left in the product.

It must be observed, that the desirable effect produced through the use of these diluents, is not to be attributed to an alkylation reaction between the diluents and the olefinic hydrocarbons involved in the polymerization operation. The relatively low temperatures used in our process, and the relatively high iodine number of the products obtained, are proof that very little alkylation, if any, occurs.

The amount of saturated hydrocarbon diluent used, ordinarily varies between about 50% and about 95%, with respect to the weight of the olefinic hydrocarbons in the charge.

The process may be carried out as a batch, continuous, or semi-continuous type of operation. Particularly when the process is carried out on a commercial scale, economic considerations make it preferable to operate in a continuous manner. For efficient operation, whether the process is carried out on a batch or continuous basis, it is essential that the olefinic hydrocarbon reactants be intimately contacted with the catalysts of our invention. This may be effected in several ways. For example, when the reaction involves interpolymerization, one of the olefinic hydrocarbon reactants may be pumped into a mixture comprising the fluophosphoric acid, the other olefinic hydrocarbon reactant, and, where desirable, a saturated hydrocarbon diluent; or, a mixture of the olefinic hydrocarbon reactants may be pumped into a mixture comprising a fluophosphoric acid and a mixture of saturated hydrocarbon diluents; or, a mixture of the olefinic hydrocarbon reactants and diluent may be pumped into a reaction zone containing a fluophosphoric acid.

In the process of our invention, the temperature to be used usually varies between about 32° F. and about 140° F., and preferably, between about 65° F. and about 85° F. The pressure to be employed depends upon the temperature used, and ordinarily, a pressure sufficient to maintain the reactants in the liquid phase at the temperature employed, is adequate. The reaction period, whether the operation involves copolymerization or interpolymerization, depends, of course, upon the temperature, the nature of the reactants employed, and to a certain extent, upon the pressure. We have found that in batch operation, a reaction period varying between about one minute and 30 minutes ordinarily, is satisfactory.

It must be understood, of course, that the reaction variables are more or less interdependent, hence, when one is arbitrarily fixed, the limits within which the others may be varied are somewhat restricted. In any particular instance, the most desirable conditions can be readily ascertained by one skilled in the art, the working ranges of these variables in the preferred operation of our process, that of manufacturing motor fuels, having been indicated hereinbefore.

Without any intended restriction of the scope of the present invention, the following examples are submitted as illustrative of the results obtainable in carrying out the process of our invention:

Example 1

5500 c. c. of a refinery $C_4$-cut containing 12.0% isobutene and 21.6% 1- and 2-butenes, were pumped into an autoclave containing 175 grams of monofluophosphoric acid, at a rate of 80 c. c. per minute. The temperature was maintained at 80° F. After debutanization, the polymer product weighed 590 grams and had a specific gravity at 60° F., of 0.732. The gaseous product analyzed as follows:

| | Per cent |
|---|---|
| Isobutene | 0 |
| 1- and 2-butenes | 15.3 |

These results indicate that 12 parts of isobutene and 6.3 parts of 1- and 2-butenes were polymerized.

Example 2

5500 c. c. of a refinery C₄-cut containing 6.4% isobutene and 17.4% 1- and 2-butenes, were pumped into an autoclave containing 160 grams of monofluophosphoric acid which had been used in the run described in Example 1, at a rate of 160 c. c. per minute. The temperature was maintained at 75° F. After debutanization, the polymer product weighed 320 grams and had a specific gravity at 60° F. of 0.742. The gaseous product analyzed as follows:

| | Per cent |
|---|---|
| Isobutene | 0.2 |
| 1- and 2-butenes | 12.2 |

These results indicate that 6.2 parts of isobutene and 5.2 parts of 1- and 2-butenes were polymerized.

The octene polymers produced were hydrogenated and the product was then subjected to infra-red analysis with the following results:

| | Per cent |
|---|---|
| 2,3-dimethyl hexane | 27.5 |
| 2,2,3-trimethyl pentane | 25.1 |
| 2,3,4-trimethyl pentane | 21.6 |
| 2,2,4-trimethyl pentane | 15.0 |
| 2,2-dimethyl hexane | 10.2 |
| 2,3,3-trimethyl pentane | 0.6 |
| | 100.0 |

Example 3

5000 c. c. of a refinery C₄-cut containing 7.5% isobutene and 16.5% 1- and 2-butenes, were pumped into an autoclave containing 245 grams of difluophosphoric acid, at a rate of 200 c. c. per minute. The temperature was maintained at 74° F. After debutanization, the polymer product weighed 172 grams and had a specific gravity at 60° F., of 0.763. The gaseous product analyzed as follows:

| | Per cent |
|---|---|
| Isobutene | 3.6 |
| 1- and 2-butenes | 13.4 |

These results indicate that 3.9 parts of isobutene and 3.1 parts of 1- and 2-butenes were polymerized.

Example 4

3000 c. c. of isobutylene were pumped into an autoclave containing 300 grams of monofluophosphoric acid, at a rate of 60–80 c. c. per minute. The temperature was maintained at 70–75° F. 1390 grams of polymer product having a Norwood bromine number of 114.1, were obtained.

Example 5

1700 c. c. of a refinery C₄-cut containing 12.0% of isobutene and 19.6% 1- and 2-butenes, were pumped into an autoclave containing 500 grams of monofluophosphoric acid, at a rate of 240 c. c. per minute. The temperature was maintained at 70–75° F. The gaseous product analyzed as follows:

| | Per cent |
|---|---|
| Isobutene | 4.1 |
| 1- and 2-butenes | 14.9 |

These results indicate that 7.9% isobutene and 4.7% 1- and 2-butenes were used up in the operation. The polymer product had a Norwood bromine number of 139.3.

The polymer products obtained in Examples 4 and 5, were subjected to an A. S. T. M. distillation and the following results were obtained (the octenes boil between 209° F. and 270° F.):

| | Example 4 | Example 5 |
|---|---|---|
| | ° F. | ° F. |
| Initial boiling point | 96 | 114 |
| 5% | 179 | 177 |
| 10% | 251 | 209 |
| 20% | 290 | 226 |
| 30% | 328 | 238 |
| 40% | 347 | 244 |
| 50% | 364 | 254 |
| 60% | 374 | 268 |
| 70% | 389 | 320 |
| 80% | 440 | 365 |
| 90% | 523 | 408 |
| End point | 530 | 490 |
| Percent recovered | 92.0 | 96.0 |
| Percent residue | 0.7 | 1.8 |
| Percent loss | 7.3 | 2.2 |

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. The process of manufacturing high-octane motor fuel, which comprises contacting normally gaseous olefinic hydrocarbons with polymerization catalytic material selected from the group consisting of monofluophosphoric acid and difluophosphoric acid, in the presence of paraffinic hydrocarbon material, in a reaction zone, at temperatures varying between about 32° F. and about 140° F., and at a pressure sufficient to maintain the olefinic hydrocarbons in liquid phase, said catalytic material being prepared outside said reaction zone.

2. The process of manufacturing high-octane motor fuel, which comprises contacting normally gaseous olefinic hydrocarbons with monofluophosphoric acid, in the presence of paraffinic hydrocarbon material, in a reaction zone, at temperatures varying between about 65° F. and about 85° F., and at a pressure sufficient to maintain the olefinic hydrocarbons in liquid phase, said monofluophosphoric acid being prepared outside said reaction zone.

3. The process of manufacturing high-octane motor fuel, which comprises contacting normally gaseous olefinic hydrocarbons with polymerization catalytic material selected from the group consisting of monofluophosphoric acid and difluophosphoric acid, in the presence of paraffinic hydrocarbon material selected from the group consisting of propane, butane, pentane, isobutane, and isopentane, in a reaction zone, at temperatures varying between about 32° F. and about 140° F., and at a pressure sufficient to maintain the olefinic hydrocarbons in liquid phase, said catalytic material being prepared outside said reaction zone.

4. The process of manufacturing high-octane motor fuel, which comprises contacting normally gaseous olefinic hydrocarbons with monofluophosphoric acid, in the presence of paraffinic hydrocarbon material selected from the group consisting of propane, butane, pentane, isobutane, and isopentane, in a reaction zone, at temperatures varying between about 65° F. and about 85° F., and at a pressure sufficient to maintain the olefinic hydrocarbons in liquid phase, said monofluophosphoric acid being prepared outside said reaction zone.

5. The process of manufacturing high-octane motor fuel, which comprises contacting a C₄ refinery cut with polymerization catalytic material selected from the group consisting of monofluophosphoric acid and difluophosphoric acid, in a reaction zone, at temperatures varying between about 32° F. and about 140° F., and at a pressure sufficient to maintain the olefinic hydrocarbons in the charge in liquid phase, said catalytic material being prepared outside said reaction zone.

6. The process of manufacturing high-octane motor fuel, which comprises contacting a C₄ refinery cut with monofluophosphoric acid, in a reaction zone, at temperatures varying between about 65° F. and about 85° F., and at a pressure sufficient to maintain the olefinic hydrocarbons in the charge in liquid phase, said monofluophosphoric acid being prepared outside said reaction zone.

7. The process of polymerizing olefinic hydrocarbons, which comprises contacting said olefinic hydrocarbons with polymerization catalytic material selected from the group consisting of monofluophosphoric acid and difluophosphoric acid, in a reaction zone, at temperatures varying between about 32° F. and about 140° F., and at a pressure sufficient to maintain the olefinic hydrocarbons in liquid phase, said catalytic material being prepared outside said reaction zone.

8. The process of polymerizing olefinic hydrocarbons, which comprises contacting said olefinic hydrocarbons with monofluophosphoric acid, in a reaction zone, at temperatures varying between about 65° F. and about 85° F., and at a pressure sufficient to maintain the olefinic hydrocarbons in liquid phase, said monofluophosphoric acid being prepared outside said reaction zone.

9. The process of polymerizing olefinic hydrocarbons, which comprises contacting said olefinic hydrocarbons with polymerization catalytic material selected from the group consisting of monofluophosphoric acid and difluophosphoric acid, in the presence of paraffinic hydrocarbon material, in a reaction zone at temperatures varying between about 32° F. and about 140° F., and at a pressure sufficient to maintain the olefinic hydrocarbons in liquid phase, said catalytic material being prepared outside said reaction zone.

10. The process of polymerizing olefinic hydrocarbons, which comprises contacting said olefinic hydrocarbons with monofluophosphoric acid, in the presence of paraffinic hydrocarbon material, in a reaction zone, at temperatures varying between about 65° F. and about 85° F., and at a pressure sufficient to maintain the olefinic hydrocarbons in liquid phase, said monofluophosphoric acid being prepared outside said reaction zone.

11. The process of polymerizing olefinic hydrocarbons, which comprises contacting said olefinic hydrocarbons with polymerization catalytic material selected from the group consisting of monofluophosphoric acid and difluophosphoric acid, in the presence of paraffinic hydrocarbon material selected from the group consisting of propane, butane, pentane, isobutane, and isopentane, in a reaction zone, at temperatures varying between about 32° F. and about 140° F., and at a pressure sufficient to maintain the olefinic hydrocarbons in liquid phase, said catalytic material being prepared outside said reaction zone.

12. The process of polymerizing olefinic hydrocarbons, which comprises contacting said olefinic hydrocarbons with monofluophosphoric acid, in the presence of paraffinic hydrocarbon material selected from the group consisting of propane, butane, pentane, isobutane, and isopentane, in a reaction zone, at temperatures varying between about 65° F. and about 85° F., and at a pressure sufficient to maintain the olefinic hydrocarbons in liquid phase, said monofluophosphoric acid being prepared outside said reaction zone.

JOHN W. BROOKS.
ARLIE A. O'KELLY.
ROBERT H. WORK.